United States Patent
Fume

(10) Patent No.: US 8,275,781 B2
(45) Date of Patent: Sep. 25, 2012

(54) PROCESSING DOCUMENTS BY MODIFICATION RELATION ANALYSIS AND EMBEDDING RELATED DOCUMENT INFORMATION

(75) Inventor: Kosei Fume, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 651 days.

(21) Appl. No.: 12/357,469

(22) Filed: Jan. 22, 2009

(65) Prior Publication Data

US 2009/0193325 A1 Jul. 30, 2009

(30) Foreign Application Priority Data

Jan. 29, 2008 (JP) .................................. 2008-017441

(51) Int. Cl.
 *G06F 17/30* (2006.01)
(52) U.S. Cl. ............. 707/758; 704/9; 715/254; 715/256
(58) Field of Classification Search ........................ 704/9
 See application file for complete search history.

(56) References Cited

U.S. PATENT DOCUMENTS

| | | | | |
|---|---|---|---|---|
| 5,170,349 A | * | 12/1992 | Yagisawa et al. | 704/9 |
| 6,026,388 A | * | 2/2000 | Liddy et al. | 1/1 |
| 6,081,774 A | * | 6/2000 | de Hita et al. | 704/9 |
| 2003/0051214 A1 | * | 3/2003 | Graham et al. | 715/512 |
| 2004/0073531 A1 | * | 4/2004 | Patterson | 707/1 |
| 2006/0206463 A1 | * | 9/2006 | Takachio et al. | 707/3 |
| 2007/0233465 A1 | * | 10/2007 | Sato et al. | 704/10 |
| 2008/0091706 A1 | | 4/2008 | Suzuki et al. | |
| 2008/0154951 A1 | * | 6/2008 | Martinez et al. | 707/103 Y |
| 2009/0077122 A1 | | 3/2009 | Fume et al. | |

FOREIGN PATENT DOCUMENTS

JP 2003-108598 4/2003

OTHER PUBLICATIONS

Xu Yun, Zhang Feng, "Using SVM to construct a Chinese dependency parser", J Zhejian Univ Science A, 2006 7(2):199-203 (2006).*
Raffaella Brighi, et al., "Towards Semantic Interpretation of Legal Modifications through Deep Syntactic Analysis," In Proceedings of the 2008 conference on Legal Knowledge and Information Systems: JURIX 2008, 202-206 (2008).*

* cited by examiner

*Primary Examiner* — Doug Hutton, Jr.
*Assistant Examiner* — Scott M Kelly
(74) *Attorney, Agent, or Firm* — Turocy & Watson, LLP

(57) ABSTRACT

A document processing apparatus is provided that facilitates location of elements within a document to be modified. To this end, the document processing apparatus analyzes document data for modification relations in character strings or between character strings within the document data, and embeds attribute tags within the text document data representing the modification relations. An XML document having the embedded attribute tags is stored in a data storage area, and can subsequently be searched using the embedded tags as search keys.

20 Claims, 16 Drawing Sheets

FIG.2

```
<?xml version="1.0" encoding="utf-8" ?>
<rules>
        <tag val="(TAG NAME)">                                                   ~201
                <begin exp="(SURFACE EXPRESSION)" att="{E|S|C}" hid="(PARAMETER)"/>  ~202
                <end exp="(SURFACE EXPRESSION)" att="{E|S|C}" hid="(PARAMETER)"/>    ~203
                <range bshift="{..|-2|-1|0|1|2|..}"
                        eshift="{..|-2|-1|0|1|2|..}" />   ~204
        </tag>
</rules>
                        ⋮
```

FIG.3

```
<?xml version="1.0" encoding="utf-8" ?>
<rules>
        <tag val="position">
                <begin exp="*" hid="97" or hid="98" />
                <end exp="REPRESENTATIVE" att="S" />
                <range bshift="1" eshift="0" />
        </tag>
</rules>
                        ⋮
```

FIG.4

```
<rules><!-- s-title LABEL ASSIGNMENT -->
        <tag val="s-title">
                <begin exp="(CHAPTER|ARTICLE|SECTION)"[1-9]"/>
        </tag>
<rules>
```
⎫
⎬ 401
⎭

```
<rules><!-- LABEL ASSIGNMENT UNDER CONDITION OF ADJACENT TAG -->
<!-- EXAMPLE: BY USING APPEARANCE OF s-title AS CLUE, ASSIGN s-body
TO OTHER AREA -->
        <tag val="s-body" command="xor">
                <begin label="s-title" />
        </tag>
</rules>
    ⋮
```
⎫
⎬ 402
⎭

FIG.5

| RULE NUMBERS | CHARACTER STRINGS | DOCUMENT STRUCTURES | DOCUMENT TYPES | ASSIGNED POINTS |
|---|---|---|---|---|
| RULE ID 1 | "MINUTE" | "title_area" | "minute" | 100 |
| RULE ID 2 | "PROPOSAL" | "title_area" | "proposal" | 80 |
| RULE ID 3 | "CHECK SHEET" | "body" | "checksheet" | 10 |
| ⋮ | ⋮ | ⋮ | ⋮ | ⋮ |

FIG.6

```
TIME INFORMATION:
    <CONDITIONAL DESCRIPTION>      <CORRESPONDING LABEL>
    %d{4}                          %d{4}=YEAR
    %d{6}                          %d{2}=YEAR, %d{2}=Month, %d{2}=Day TYPE INFORMATION:
    <CONDITIONAL DESCRIPTION>      <CORRESPONDING LABEL>
    MINUTES                        TYPE val="minute"
    HANDOUT                        TYPE val="handout"
    SPECIFICATIONS                 TYPE val="spec"

AFFILIATION INFORMATION:
    <CONDITIONAL DESCRIPTION>      <CORRESPONDING LABEL>
    [FIRST NAME-FAMILY NAME]       PERSONAL NAME
    [NAME-COMPANY NAME]            COMPANY
```

FIG.7

INFORMATION SECURITY MANAGEMENT REGULATIONS
CREATOR: SECURITY MANAGEMENT DEPARTMENT
ISSUED DATE: JUNE 3, 2002
MODIFIED DATE: SEPTEMBER 3, 2002

CHAPTER 1    GENERAL RULES

ARTICLE 1    THE RULES SHALL SPECIFY MATTERS NECESSARY FOR MANAGEMENT OF INFORMATION SECURITY.

ARTICLE 2    ENCRYPTION AUTHORIZED BY THE SYSTEM ADMINISTRATORS SHALL BE USED. KEYS USED FOR THE ENCRYPTION SHALL BE MANAGED APPROPRIATELY.

2. THE SYSTEM ADMINISTRATORS SHALL SEEK TO STABLY OPERATE THE INFORMATION SYSTEM AND ASSURE THE INFORMATION SECURITY IN MUTUAL COOPERATION OF THE SYSTEM ADMINISTRATORS AND IN COOPERATION WITH THE INFORMATION MANAGEMENT REPRESENTATIVE, AND THE LIKE.

(S) ARTICLE 3    THE INFORMATION-SECURITY MANAGEMENT REPRESENTATIVE (V) SHALL SUBMIT (O) THE "NEW-CALCULATOR REGISTRATION APPLICATION FORM" TO THE SECURITY MANAGEMENT DEPARTMENT AT INSTALLATION OF NEW CALCULATORS.

2. THE TERMS IN FOLLOWING SUBSECTIONS SHALL HAVE THE MEANINGS ASSIGNED THERETO IN THE CORRESPONDING SUBSECTIONS, RESPECTIVELY.

FIG.8

| MORPHEME | WORD CLASS INFORMATION |
|---|---|
| INFORMATION | NOUN-GENERAL |
| SECURITY | NOUN-GENERAL |
| MANAGEMENT | NOUN-SAHEN CONJUNCTIVE |
| REGULATIONS | NOUN-SAHEN CONJUNCTIVE |
| | (BREAK) |
| CREATOR | NOUN-GENERAL |
| : | SYMBOL-GENERAL |
| SECURITY | NOUN-GENERAL |
| MANAGEMENT | NOUN-SAHEN CONJUNCTIVE |
| DEPARTMENT | NOUN-SUFFIX-GENERAL |
| | (BREAK) |
| ISSUED | NOUN-SAHEN CONJUNCTIVE |
| DATE | NOUN-SUFFIX-GENERAL |
| : | SYMBOL-GENERAL |
| 2002 | NUMERICAL VALUE |
| YEAR | NOUN-GENERAL |
| 6 | NUMERICAL VALUE |
| MONTH | NOUN-GENERAL |
| 3 | NUMERICAL VALUE |
| DAY | NOUN-SUFFIX-GENERAL |
| | (BREAK) |
| MODIFIED | NOUN-SAHEN CONJUNCTIVE |
| DATE | NOUN-SUFFIX-GENERAL |

FIG.9

(S) ARTICLE 3   THE INFORMATION-SECURITY MANAGEMENT REPRESENTATIVE (V) SHALL SUBMIT (O) THE "NEW-CALCULATOR REGISTRATION APPLICATION FORM" TO THE SECURITY MANAGEMENT DEPARTMENT AT INSTALLATION OF NEW CALCULATORS.

2. THE TERMS IN FOLLOWING SUBSECTIONS SHALL HAVE THE MEANINGS ASSIGNED THERETO IN THE CORRESPONDING SUBSECTIONS, RESPECTIVELY.

FIG.10

INFORMATION SECURITY MANAGEMENT REGULATIONS
CREATOR: SECURITY MANAGEMENT DEPARTMENT
ISSUED DATE: JUNE 3, 2002
MODIFIED DATE: SEPTEMBER 3, 2002

CHAPTER 1    GENERAL RULES

ARTICLE 1    THE RULES SHALL SPECIFY MATTERS NECESSARY FOR MANAGEMENT OF INFORMATION SECURITY.

ARTICLE 2    ENCRYPTION AUTHORIZED BY THE SYSTEM ADMINISTRATORS SHALL BE USED. KEYS USED FOR THE ENCRYPTION SHALL BE MANAGED APPROPRIATELY.

2. THE SYSTEM ADMINISTRATORS SHALL SEEK TO STABLY OPERATE THE INFORMATION SYSTEM AND ASSURE THE INFORMATION SECURITY IN MUTUAL COOPERATION OF THE SYSTEM ADMINISTRATORS AND IN COOPERATION WITH THE INFORMATION MANAGEMENT REPRESENTATIVE, AND THE LIKE.

ARTICLE 3    <subject>THE INFORMATION-SECURITY MANAGEMENT REPRESENTATIVE</subject><action>SHALL SUBMIT</action><object>THE "NEW-CALCULATOR REGISTRATION APPLICATION FORM"</object>TO THE SECURITY MANAGEMENT DEPARTMENT AT INSTALLATION OF NEW CALCULATORS.

2. THE TERMS IN FOLLOWING SUBSECTIONS SHALL HAVE THE MEANINGS ASSIGNED THERETO IN THE CORRESPONDING SUBSECTIONS, RESPECTIVELY.

FIG.11

EACH/DEPARTMENT/INFORMATION/SECURITY/MANAGEMENT/REPRESENTATIVE/, /CORRECTIVE/ACTION···

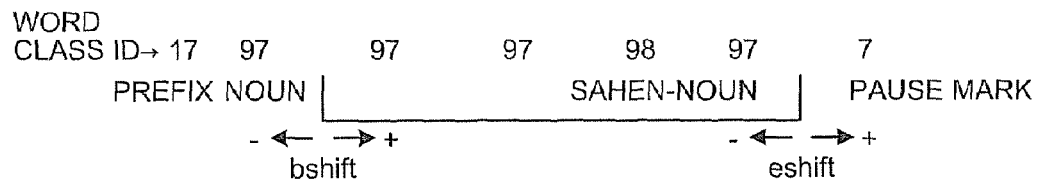

FIG.12

```
<document_title val="self">INFORMATION SECURITY MANAGEMENT REGULATIONS</document_title>
<header>
CREATOR: <department val="creator">SECURITY MANAGEMENT DEPARTMENT</department>
ISSUED DATE: <date val="issued">JUNE 3, 2002</date>
MODIFIED DATE: <date val="modified">SEPTEMBER 3, 2002</date>
</header>
<section_title val="1">CHAPTER 1 GENERAL RULES</section_title>

<subsection val="1">ARTICLE 1 THE RULES SHALL SPECIFY MATTERS NECESSARY
FOR MANAGEMENT OF INFORMATION SECURITY.</subsection>

<subsection val="2">ARTICLE 2 ENCRYPTION AUTHORIZED BY THE SYSTEM ADMINISTRATORS
SHALL BE USED. KEYS USED FOR THE ENCRYPTION SHALL BE MANAGED APPROPRIATELY.
</subsection>

<subsubsection val="2">THE SYSTEM ADMINISTRATORS SHALL SEEK TO STABLY OPERATE
THE INFORMATION SYSTEM AND ASSURE THE INFORMATION SECURITY IN MUTUAL
COOPERATION OF THE SYSTEM ADMINISTRATORS AND IN COOPERATION WITH THE
INFORMATION MANAGEMENT REPRESENTATIVE, AND THE LIKE.</subsubsection>

<subsection val="1">ARTICLE 3<subject><position>THE INFORMATION-SECURITY MANAGEMENT
REPRESENTATIVE</position></subject><action>SHALL SUBMIT</action><object>"<document>"
THE NEW-CALCULATOR REGISTRATION APPLICATION FORM"</document>"</object>TO
<department>THE SECURITY MANAGEMENT DEPARTMENT</department>
AT INSTALLATION OF NEW CALCULATORS.</subsection>

<subsubsection val="2">THE TERMS IN FOLLOWING SUBSECTIONS SHALL HAVE THE MEANINGS
ASSIGNED THERETO IN THE CORRESPONDING SUBSECTIONS, RESPECTIVELY.</subsubsection>
```

FIG.13

FILE NAME: "INFORMATION SECURITY MANAGEMENT REGULATIONS_071003design_rev2.doc"

```
<root><meta>
    <fileinfo>
        <doctype>regulations</doctype>
        <date>071003</date>                          } 1301
        <rev>rev2</rev>
        <fileformat>doc</fileformat>
    </fileinfo>
</meta>
<document_title val="self">INFORMATION SECURITY MANAGEMENT REGULATIONS</document_title>
<header>
CREATOR: <department val="creator">SECURITY MANAGEMENT DEPARTMENT</department>
ISSUED DATE: <date val="issued">JUNE 3, 2002</date>
MODIFIED DATE: <date val="modified">SEPTEMBER 3, 2002</date>
</header>
<section_title val="1">CHAPTER 1 GENERAL RULES</section_title>
    <subsection val="1">ARTICLE 1 THE RULES SHALL SPECIFY MATTERS NECESSARY FOR MANAGEMENT OF
    INFORMATION SECURITY.</subsection>

<subsection val="2">ARTICLE 2 ENCRYPTION AUTHORIZED BY THE SYSTEM ADMINISTRATORS SHALL BE USED.
    KEYS USED FOR THE ENCRYPTION SHALL BE MANAGED APPROPRIATELY.</subsection>

<subsubsection val="2">THE SYSTEM ADMINISTRATORS SHALL SEEK TO STABLY OPERATE
        THE INFORMATION SYSTEM AND ASSURE THE INFORMATION SECURITY IN MUTUAL COOPERATION OF THE
        SYSTEM ADMINISTRATORS AND IN COOPERATION WITH THE INFORMATION MANAGEMENT
        REPRESENTATIVE, AND THE LIKE.</subsubsection>

<subsection val="1">ARTICLE 3 <subject><position>THE INFORMATION-SECURITY MANAGEMENT REPRESENTATIVE
    </position></subject><action>SHALL SUBMIT</action> THE <object><document val="external"> NEW-CALCULATOR
    REGISTRATION APPLICATION FORM</document>"</object>TO<department>THE SECURITY MANAGEMENT
    DEPARTMENT</department>AT INSTALLATION OF NEW CALCULATORS.</subsection>                                    —1302

<subsubsection val="2">THE TERMS IN FOLLOWING SUBSECTIONS SHALL HAVE THE MEANINGS ASSIGNED
        THERETO IN THE CORRESPONDING SUBSECTIONS, RESPECTIVELY.
        </subsubsection>
```

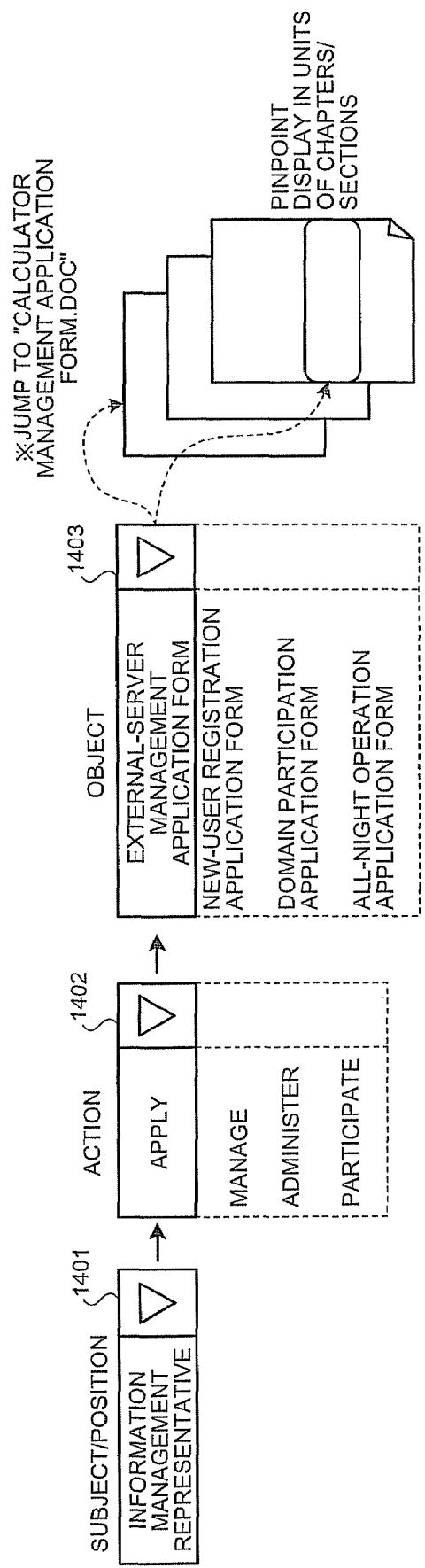

PROCESSING DOCUMENTS BY MODIFICATION RELATION ANALYSIS AND EMBEDDING RELATED DOCUMENT INFORMATION

CROSS-REFERENCE TO RELATED APPLICATIONS

This application is based upon and claims the benefit of priority from the prior Japanese Patent Application No. 200817441, filed on Jan. 29, 2008; the entire contents of which are incorporated herein by reference.

BACKGROUND OF THE INVENTION

1. Field of the Invention

The present invention relates to an apparatus, a method and a computer program product for processing documents.

2. Description of the Related Art

In companies, documents containing regulations and the like have commonly been computerized and managed on servers, or the like.

The regulation documents in companies are the basis for business activities. Therefore, when changes in business processes resulting from daily company activities or public movements, or changes of organization names occur, the corresponding regulation documents need to be appropriately modified or updated to properly reflect these changes.

However, practical regulation documents themselves are usually described in a specific file format or the like, and stored flatly in a database in the company. Even when the regulation documents are classified, only a simple classification is performed in many cases such that the regulation documents are partially related to an organizational hierarchy.

A manager that manages the regulation documents creates new regulation documents, and then continuously revises or updates the documents. The manager needs to perform the revision or update according to the business activities. It is quite difficult in the nature of the businesses that are daily revised to predict parts that will be modified in the further, and to perform modulation thereof by separating these parts as reusable parts from other parts, or the like, at the creation of the regulation documents, to facilitate the revision or update.

That is, parts to be revised and parts that do not need to be revised are mixed in the regulation documents. Accordingly, when the business processes or the organization names are to be changed, finding parts that are affected by the change in a large quantity of the regulation documents imposes a great workload.

A technique described in JP-A 2003-108598 (KOKAI) enables to, when data of documents such as laws are registered in a document management database, simultaneously store relevant acts, points to be checked, arguments, and the like, in the database. In this way, when a law is displayed for example on a viewing screen, relevant information is simultaneously presented, so that the relevant information can be easily referred to. By applying this technique, parts that are affected by the change can be found.

However, the technique as described in JP-A 2003-108598 (KOKAI) needs to previously register the relevant information in the database at the registration of the document. Therefore, it is difficult to identify document data or relevant document data to be modified by tracing link identification information or a search key that is not previously expected, when the businesses or organization names are changed after the registration.

SUMMARY OF THE INVENTION

According to one aspect of the present invention, a document processing apparatus includes an extracting unit that extracts text document information from a document data; an analyzing unit that analyzes a modification relation of a character string included in the text document information; an attribute unit that assigns an attribute indicating details of the modification relation to the character string, and embeds the attribute in the text document information; a document specifying unit that specifies a document-specifying character string that specifies other text document information, using the text document information in which the attribute is embedded by the attribute unit; a document-identification unit that assigns document identification information to the document-specifying character string, and embeds the document identification information in the text document information; a receiving unit that receives a character string; a determining unit that determines whether the text document information includes a document-specifying character string having the modification relation with the character string received by the receiving unit, based on the attribute and the document identification information embedded in the text document information; and an identifying unit that identifies other text document information indicated by the document-specifying character string, when it is determined that the text document information includes the document-specifying character string.

According to another aspect of the present invention, a document processing method includes extracting text document information from a document data; analyzing a modification relation of a character string included in the text document information; assigning an attribute indicating details of the modification relation to the character string indicated by the modification relation, and embedding the attribute in the text document information; specifying a document-specifying character string indicating a character string that specifies other text document information, using the text document information in which the attribute is embedded in the embedding; assigning document identification information to the document-specifying character string, and embedding the document identification information in the text document information; receiving a character string; determining whether the text document information includes a document-specifying character string having the modification relation with the character string, based on the attribute and the document identification information embedded in the text document information; and identifying other text document information indicated by the document-specifying character string, when it is determined that the text document information includes the document-specifying character string.

A computer program product according to still another aspect of the present invention causes a computer to perform the method according to the present invention.

BRIEF DESCRIPTION OF THE DRAWINGS

FIG. 2 is a drawing illustrating a template of structuring rules stored in a structuring-rule storage unit;

FIG. 3 is a drawing illustrating an example of the structuring rules stored in the structuring-rule storage unit;

FIG. 4 is a drawing illustrating an example of document-logic structuring rules stored in a document-logic structuring-rule storage unit;

FIG. 5 is a drawing illustrating an example of file-content determining rules stored in a file-content determining-rule storage unit;

FIG. 6 is a drawing illustrating an example of file-name analyzing rules stored in a file-name analyzing-rule storage unit;

FIG. 7 is a drawing illustrating an example of document data inputted by an input unit;

FIG. 8 is a drawing illustrating an example of a result of a morphological analysis for document data, performed by a morphological analyzing unit;

FIG. 9 is a drawing illustrating an example of a result of a syntactic analysis performed by a syntactic analyzing unit;

FIG. 10 is a drawing illustrating an example in which attribution tags indicating modification relations are embedded in text document information by a logical-structure embedding unit;

FIG. 11 is a drawing illustrating an example of a method performed by the logical-structure embedding unit for identifying a range to which an attribution tag is assigned, by using the structuring rules as shown in FIG. 3;

FIG. 12 is a drawing illustrating an example of text document information after the attribute tags are embedded by a document-structure embedding unit;

FIG. 13 is a drawing illustrating an example of the text document information in which the attribute tags are embedded by the logical-structure embedding unit, and then meta information is embedded by a file-name determining unit, and link identification information is embedded by a link-information embedding unit;

FIG. 14 is a drawing illustrating an example of a search interface for identifying document data using a pull-down menu in the document processing apparatus;

DETAILED DESCRIPTION OF THE INVENTION

Exemplary embodiments of an apparatus, a method and a computer program product for processing documents according to the present invention will be explained below in detail with reference to the accompanying drawings.

Figure 1:
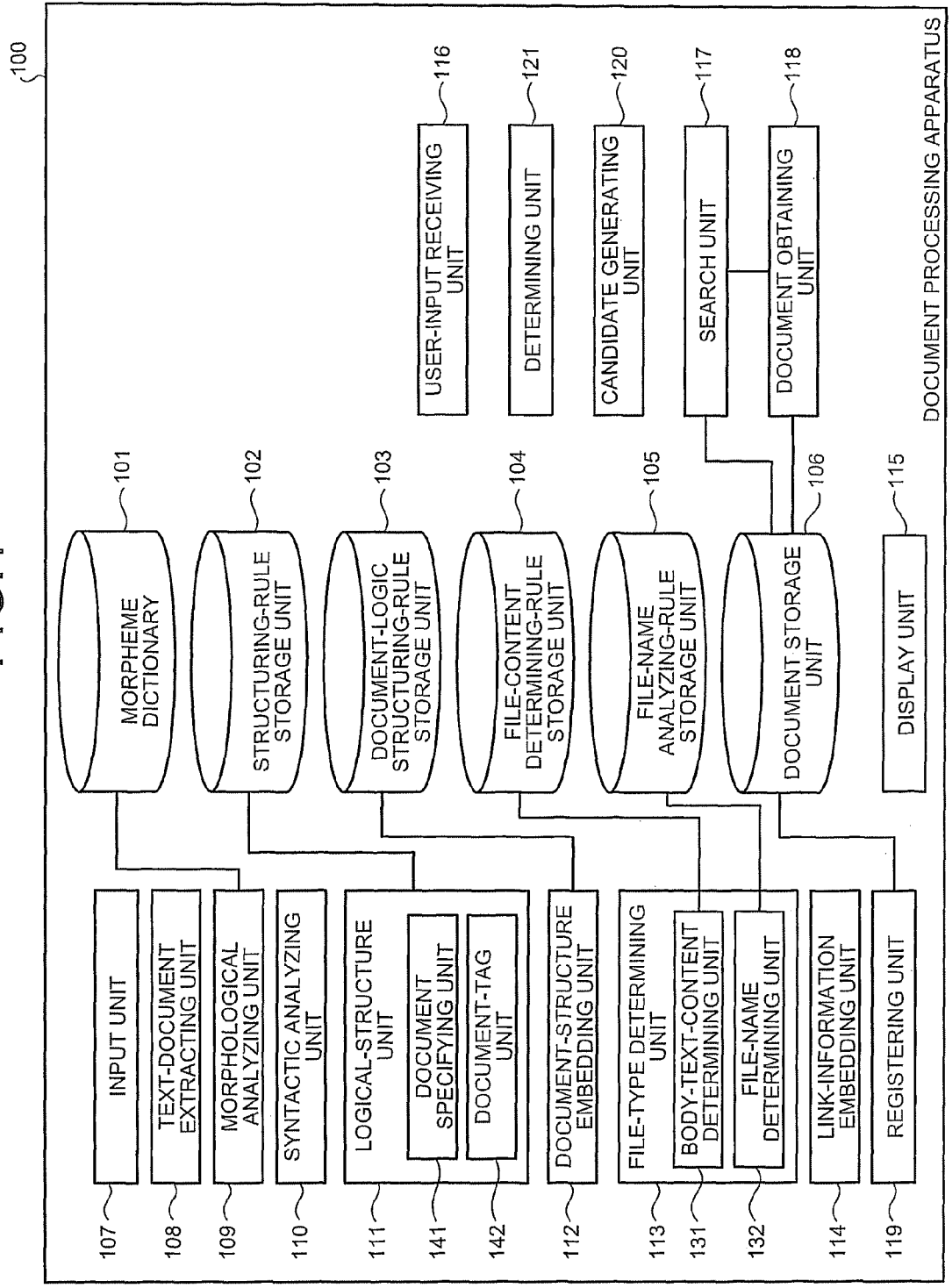
FIG. 1 is a block diagram of a configuration of a document processing apparatus according to an embodiment of the present invention.

As shown in FIG. 1, a document processing apparatus 100 according to an embodiment of the present invention includes a morpheme dictionary 101, a structuring-rule storage unit 102, a document-logic structuring-rule storage unit 103, a file-content determining-rule storage unit 104, a file-name analyzing-rule storage unit 105, and a document storage unit 106. The document processing apparatus 100 further includes an input unit 107, a text-document extracting unit 108, a morphological analyzing unit 109, a syntactic analyzing unit 110, a logical-structure unit 111, a document-structure embedding unit 112, a file-type determining unit 113, and a link-information embedding unit 114. The document processing apparatus 100 further includes a display unit 115, a user-input receiving unit 116, a search unit 117, a document obtaining unit 118, a registering unit 119, a candidate generating unit 120, and a determining unit 121.

The morpheme dictionary 101 stores therein morphemes, word classes, word class numbers, which are related to each other. Accordingly, a word class and a word class number can be assigned to a morpheme included in document data. The word class number is a unique number assigned to each word class.

The structuring-rule storage unit 102 stores therein rules for assigning tags that indicate attributes of character strings included in document data, to the character strings, respectively. As shown by a template of structuring rules depicted in FIG. 2, the rules define a tag 202 that determines a start position of a surface expression to be assigned with a tag 201, and a tag 203 that determines an end position of the surface expression.

As described above, the structuring rules declaratively describe a set of criteria for assignment of an attribute tag (structural information), and an attribute (structural information) to be attached. That is, the structuring rules define information for specifying words or regular expressions in the document data, or the order of word classes or modification relations in a sentence, to be assigned with tags.

In the tags 202 and 203, any one of "E", "S", and "C" can be defined as "att", and a word class number can be defined as "hid". As a tag <range> 204, a shift for identifying a range to be sandwiched by tags can be defined.

In an example shown in FIG. 3, a tag <position> is assigned to "(an arbitrary noun +) representative". Details of a method of determining a range to be assigned with the tag using the structuring rules are explained later.

The document-logic structuring-rule storage unit 103 stores therein rules for analyzing a structure of text document information, and assigning a tag that indicates structural information. According to document-logic structuring rules shown in FIG. 4, tags <s-title>, <s-body>, and the like can be assigned to a character string included in text document information. The text document information is text information that forms document data. For example, text information extracted from document data, text information embedded with an XML tag, and the document data itself correspond to the text document information.

The file-content determining-rule storage unit 104 stores therein file-content determining rules for determining a file type of the document based on contents of the text document information. As shown in FIG. 5, the file-content determining-rule storage unit 104 stores therein rule numbers, character strings, document structures, document types, and points assigned thereto, which are related to each other. That is, when an area indicated by a document structure includes character strings, the corresponding points assigned thereto are added for a file type that is related to the document structure and the character strings, thereby determining the file type.

The file-name analyzing-rule storage unit 105 stores therein rules for assigning a corresponding label based on a file name of the document data. As shown in FIG. 6, time information, type information, affiliation information, and the like, is included in the file name. When the file name includes a conditional description that is set for each of the information, the corresponding label related thereto is assigned.

The document storage unit 106 stores therein text document information having a tag and the like embedded in a process performed by the document processing apparatus 100, as an XML document (already subjected to a structural analysis). The document storage unit 106 also stores therein a document name and a document ID, which are related to the text document information. The document ID is uniquely assigned to a document when a user creates the document, for example.

The input unit 107 performs a process of inputting document data to be managed by the document processing apparatus 100. The document data can be of any format, and can be document data created using a word processor, a spreadsheet application, presentation software, or the like. It is assumed that regulation documents, business manuals, and various documents in companies having forms which are commonly utilized in companies are created in these formats. In the present embodiment, it is assumed that an input document as shown in FIG. 7 is processed.

The text-document extracting unit 108 extracts text document information from the inputted document data. In the present embodiment, text information is extracted as the text document information. The text-document extracting unit 108 also extracts documentary form or style information applied to a character string or a paragraph, page information, and the like. The text-document extracting unit 108 obtains the extracted text. In other words, the text-document extracting unit 108 has a function of an obtaining unit. The text-document extracting unit 108 also extracts a document name and a document ID from the document data, and relates the extracted document name and document ID of the document data to the extracted text information.

Following components determine features of the document based on the information extracted from the document data, and the documentary form and style information thereof, and then embed tags indicating the features.

The morphological analyzing unit 109 performs a morphological analysis of the extracted text information, to divide the text information into morphemes, and assigns word class information to each of the morphemes as a result of the analysis. Accordingly, word class information is assigned to each of the morphemes, as shown in FIG. 8.

Although not shown, the morphological analyzing unit 109 further assigns a word class number corresponding to the assigned word class information to each of the morphemes. The morphological analyzing unit 109 applies a property indicating a family name or a company name to a proper name among the nouns, such as a personal name or a company name, based on a morphological analysis dictionary.

The syntactic analyzing unit 110 analyzes a modification relation of a character string included in the text information. The syntactic analyzing unit 110 performs a syntactic analysis of the text information based on the Japanese grammar using the result of the morphological analysis performed by the morphological analyzing unit 109. Accordingly, a modification relation of a subject, a predicate, an object, and the like, or a modification relation between words can be specified for each of sentences included in the text information.

As shown in FIG. 9, the syntactic analyzing unit 110 identifies a modification relation of a sentence included in the text information, and also identifies a subject (S), an object (O), and a predicate (V) of the sentence. The syntactic analyzing unit 110 can also identify a complement (C), and the like.

The logical-structure unit 111 includes a document specifying unit 141 and a document-tag unit 142, and embeds a tag indicating an attribute in the text document information.

For example, the logical-structure unit 111 assigns a tag indicating an attribute to each of character strings included in the text information, by utilizing the structuring rules stored in the structuring-rule storage unit 102. Tags indicating a personal name, a company name, a location, a date expression, a position or department name, and the like can be assigned to the character strings. To perform such a process, the logical-structure unit 111 needs to previously obtain results of the analyses performed by the morphological analyzing unit 109 and the syntactic analyzing unit 110, together with the text information.

The logical-structure unit 111 embeds a tag that indicates an attribute indicating details of the modification relation into each of character strings indicated by the modification relation in the text document information, based on the result of the syntactic analysis performed by the syntactic analyzing unit 110. The attributes to be assigned to the character strings include a modification relation of the subject, the predicate, the object, and the like, and a modification relation between words, and the like. In other words, the logical-structure unit 111 has a function of an attribute unit.

In an example of a method of assigning an attribute, the logical-structure unit 111 identifies an actor of an operation, an object, and an action performed by the actor based on an ending expression of each of character strings having modification relations identified from the syntactic analysis result, and assigns attribute tags indicating the actor, the object, and the action to the character strings. The actor of the operation, the object, and the action performed by the actor can be identified from the modification relation obtained by the syntactic analyzing unit 110, that is, the analysis result shown in FIG. 9 for example.

In another example of the method, when word class information of a segment is the verb, this segment is set as an action performed by the actor.

When the syntactic analysis result as shown in FIG. 9 is used, the logical-structure unit 111 assigns a tag <subject> to a character string "information-security management representative", a tag <object> to a character string "new-calculator registration application form", and a tag <action> to "shall submit", as shown in FIG. 10. Predetermined conditions can be set to embed these tags. A conceivable example of the conditions is that the embedding is performed only provided the tag <object> includes information for linking to another document.

The document specifying unit 141 included in the logical-structure unit 111 identifies the document name, the document ID, and a clause or phrase referenced in a sentence, from the text information. A character string that specifies the document, such as the document name, the document ID, and the clause or phrase referenced in a sentence is hereinafter referred to as "document-specifying character string".

The document-tag unit 142 included in the logical-structure unit 111 assigns a tag <document> indicating the document, to the document-specifying character string identified by the document specifying unit 141. In other words, the document-tag unit 142 has a function of an document-identification unit.

A method of identifying a range to be assigned with a tag, performed by the logical-structure unit 111 is explained In an example as shown in FIG. 11, the logical-structure unit 111 identifies a range to be assigned with a tag <position> by using the structuring rules as shown in FIG. 3. In this example, according to the structuring rules shown in FIG. 3, the logical-structure unit 111 first identifies a character string "representative". According to this structuring rules eshift (end shift control)=0, and therefore the end is fixed to "representative". However, because bshift=1, forward shift (toward the beginning of reading) is continuously performed as long as the word class number is "97" or "98", to search for a start position. Accordingly, the logical-structure unit 111 identifies "information-security management representative" as a range to be assigned with the tag <position>.

A variety of other structuring rules is conceivable. Structuring rules for identifying a document name as a kind of the document-specifying character string are explained. In an example in which the same logic as that of the structuring rules above mentioned is applied, the document specifying unit 141 identifies "application form" instead of "representative". The document specifying unit 141 then keeps performing the forward shift (toward the beginning of reading) from the identified "application form" as long as the word class number is "97" or "98" to search for a start position, thereby finally identifying a character string "new-calculator registration application form". The document-tag unit 142 assigns a tag <document> to the identified "new-calculator registration application form", and embeds the tag in the text information. According to these structuring rules, the document-tag unit 142 can assign the tag <document> to a document name included in the text information. The tag <document> can be assigned in the same manner to the document-specifying character strings other than the document name.

When the text information includes a pattern of a numerical value +"year", "month", and "day", or a representation such as "YYYY/MM/DD" (Y, M, D is a numerical value corresponding to the year, month, and day, respectively), the logical-structure unit 111 assigns a tag indicating a date expression to the character string.

The logical-structure unit 111 assigns a tag indicating a personal name to a connected character string that is determined as a family name and a first name of a proper name, from the result of the morphological analysis. In this way, the logical-structure unit 111 assigns a tag indicating a character string to the character string, based on the result of the morphological analysis.

As described above, the logical-structure unit 111 can assign a tag indicating an attribute to a semantic term or explicit biographical information included in the text information, by using the morphological analysis result or the syntactic analysis result.

The document-structure embedding unit 112 determines a logical structure of a document according to the structuring rules stored in the document-logic structuring-rule storage unit 103. The document-structure embedding unit 112 determines the logical structure based on the extracted text information, the documentary form or style information applied to a character string or paragraph, the page information, and the word class information or modification relation analyzed by the morphological analyzing unit 109 or the syntactic analyzing unit 110.

In this way, the document-structure embedding unit 112 assigns a tag indicating a logical structure of the document to the character string included in the text information, and embeds the tag in the text information. A document title, a headline or subhead in the document, an itemized expression, a chapter and section structure, and the like are assigned as the logical structures. For example, in the case of the document-logic structuring rules as shown in FIG. 4, when the text information includes "(chapter|article|section)+[1-9]", a tag <s-title> is assigned to the character string according to structuring rules shown in an area 401.

The document-structure embedding unit 112 further performs a process of assigning another tag by using the assigned tag as a clue. When the structuring rules as shown in FIG. 4 are used for example, the document-structure embedding unit 112 assigns a tag <s-body> to an area other than the area assigned with the tag <s-title> according to document-logic structuring rules shown in an area 402.

That is, according to the document-logical structuring rules as shown in FIG. 4, <s-body> and <s-title> have an exclusive relationship, and <s-body> follows <s-title>. Therefore, the tag <s-body> is assigned as a complementary tag to the tag <s-title> in the text information.

As shown in FIG. 12, when the processes up to that performed by the document-structure embedding unit 112 are completed, it implies that various tags are assigned to document elements included in the extracted text information. For example, <document title> is assigned to the title of the document, and logical structure labels such as <section> and <subsection> are assigned to chapters or sections. Naturally, there are also the tags embedded by the logical-structure unit 111 and the document-tag unit 142. For example, the tag <document> is assigned to "new-calculator registration application form", the tag <position> is assigned to "information-security management representative", and a tag <department> is assigned to "security management department". The first half of the document includes a tag <date> corresponding to a date expression as the biological information, and specific attribute values indicating an issued date and a modified date are embedded in the tag <date>.

The file-type determining unit 113 includes a body-text-content determining unit 131 and a file-name determining unit 132, and determines a file type of the inputted document data. More specifically, the file-type determining unit 113 comprehensively determines a type of a file, based on a result of determination of a file type according to body text contents, performed by the body-text-content determining unit 131, and a result of determination of a file type according to a file name, performed by the file-name determining unit 132.

The body-text-content determining unit 131 determines a file type according to contents of the body text, based on the text information extracted from the document data, and the tags embedded by the document-structure embedding unit 112. For example, the body-text-content determining unit 131 determines the file type of the body text contents, by applying the file-content determining rules as shown in FIG. 5 to the text information having the tags embedded therein in the processes above mentioned. More specifically, when there is a character string and a document structure defined in the file-content determining rules shown in FIG. 5 matching the character string included in the text information and the document structure (tag) assigned to the character string, set points are assigned to a file type related according to the rules. The body-text-content determining unit 131 performs this process to the entire text information, and selects a predetermined number of file types successively from one having highest points, as the file types of the body text contents.

To specifically describe the example shown in FIG. 5, a rule ID 1 indicates that when a character string "minute" is included in a title area assigned with a tag "title_area" in the document data, the body-text-content determining unit 131 adds 100 points to a determination that the file type of the document data is "minute".

Similarly, a rule ID 2 indicates that when a character string "proposal" is included in the title area assigned with the document structure (tag) "title area", the body-text-content determining unit 131 adds 80 points to a determination that the file type is "proposal". Thus, the body-text-content determining unit 131 applies the file-content determining rules in the same way, and finally obtains a predetermined number of file types successively from one having highest points as a result of the determination of the body text contents of the document data.

The file-name determining unit 132 analyzes a file name of the document data based on file-name analyzing rules stored in the file-name analyzing-rule storage unit 105, and determines a file type of the document data based on the file name. The file-name determining unit 132 embeds details of the analysis using the file name in the text information as meta information.

For example, the file-name determining unit 132 obtains information such as a date expression, whether a characteristic word indicating a type of a document ("minute" in this example) is included, and a file format (.doc), from a file name "070614 Information security meeting minute.doc".

The file-name determining unit 132 then reads the filename analyzing rules. For example, the file-name analyzing rules as shown in FIG. 6 define rules associated with attributes of time information, type information, and affiliation information. Therefore, when the file name includes a description matching conditional descriptions set in the file-name analyzing rules, the file-name determining unit 132 embeds a corresponding label (attribute) related to the conditional description as the meta information in the text information.

In a specific example, when detecting that the file name includes a description of a four-digit numerical value, the file-name determining unit 132 relates the description of the numerical value to a YEAR label (description indicating the year), to be embedded in the text information. In another example, when detecting that the file name includes a description of a six-digit numerical value, the file-name determining unit 132 regards each of two digits thereof as a description of the year, the month, and the day, respectively, to be embedded in the text information as meta information, together with labels corresponding to, the numerical values.

Similarly, when detecting that the file name includes a description such as "minute", "handout", and "specification", the file-name determining unit 132 relates the description to a label corresponding to the description, to be embedded in the text information. The file-name determining unit 132 further embeds contents thereof (the minutes, the handout, the specification, and the like) as detailed information, as an attribute value.

The file-name determining unit 132 determines the file type based on the file name using the determination results. That is, according to the file-name analyzing rules as shown in FIG. 6, the file-name determining unit 132 determines the file type as "minute" when the file name includes "minute", as "handout" when the file name includes "handout", and as "spec" when the file name includes "specification".

When detecting that the file name includes a proper name (a family and first name expression, or a company name) as a result of the application of the morphological analysis, the file-name determining unit 132 relates such description to a label corresponding to the description, to be embedded in the text information.

The file-type determining unit 113 weighs the result of the file type determination performed by the body-text-content determining unit 131, and the result of the file type determination performed by the file-name determining unit 132. The file-type determining unit 113 combines the weighted results to provide redundancy to the determination results, thereby finally determining the file type. The determined file type can be stored as meta information in the text information, or stored related to the text information in the document storage unit 106.

An example in which "minute" and "notification" are obtained as a result of the determination based on the file body analysis, and "minute" is obtained as a result of the determination based on the file name analysis is explained. In this example, the file-type determining unit 113 evaluates the results by simply adding the same weight to the results, thereby emphasizing the determination result "minute" to determine the file type. In this way, according to the present embodiment, although the file-type determining unit 113 determines plural file types, the file-type determining unit 113 outputs the weighted results as the file types.

A weighting value to be used when the results are determined can be increased for a file type that can be determined with a higher degree of accuracy, or decreased for a file type that is difficult to determine, from the nature of the document data. In this way, the file-type determining unit 113 can obtain an appropriate result by biasing the results of the file type determination.

The link-information embedding unit 114 identifies a document-specifying character string that is referenced or cited, based on descriptions in the text information, and embeds link identification information in the tag <document> assigned to the document-specifying character string.

The link-information embedding unit 114 first extracts a document-specifying character string assigned with the tag <document> indicating a document, from the text information embedded with the tag by the logical-structure unit 111.

The link-information embedding unit 114 determines a similarity or revision relationship between different document data, based on such a relation that a word or concept similar to the document data is seen in the different document data. The link-information embedding unit 114 then embeds the link identification information for providing a link to document data having the similarity or revision relationship with the text information.

The link-information embedding unit 114 determines whether the extracted representation, document name, or document ID assigned with the tag <document> indicates the document data from which the text information is extracted, a logical structure (for example, a chapter or a section) in the document data, or document data different from the document data.

When the determination result shows that the representation or the like indicates document data different from the target document data, the link-information embedding unit 114 determines whether the indicated document data is stored in the document storage unit 106. When determining that the indicated document data is stored therein, the link-information embedding unit 114 embeds link identification information "val="external"" for example in the tag <document> assigned to the representation. Accordingly, when "val="external"" is embedded in the tag <document>, it implies that there is an external document, and that the document can be referenced by performing a search by means of the search unit 117.

On the other hand, when the determination result shows that the representation or the like indicates the target document data, or a chapter or section in the document data, the link-information embedding unit 114 embeds link identification information "val="internal"" for example in the tag <document> assigned to the representation. When a chapter or section number is specified, the link-information embedding unit 114 embeds detailed specification information in the tag <document> based on an attribution such as "target="Chapter 2, Section 3". In this way, the link-information embedding unit 114 performs the process of embedding the link identification information.

In the present embodiment, "val="internal"" and "val="external"", which are character strings indicating a chapter or section in the text information and another document data, respectively, are embedded as the link identification information for linking with a document. However, a path indicating a location where the document data is actually stored, or the like can be embedded as the link identification information.

As described above, in the present embodiment, the various analysis results are embedded as the tags or the meta data in the text information.

In an example shown in FIG. 13, results of the analysis performed by the file-name determining unit 132 to a file name "information security management regulations_ 071003 design_rev2.doc" are written in an area 1301 in a tag <fileinfo>. The link-information embedding unit 114 writes "val="external"" 1302 in the tag <document> as the link identification information.

In a different manner as that of the present embodiment, the analysis results can be written in an external file related to the text information. The external file is stored related to the original text in a form that can be easily referenced or reused.

The registering unit 119 relates the inputted document data and the text information (XML document already subjected to the syntactic analysis) having the tags embedded therein in the processes above mentioned with each other, and registers the related document data, and XML document in the document storage unit 106. In other words, the document data and the XML document are registered in the document storage unit 106 as text document information as a search target. The XML document is stored in a state where a hierarchical structure thereof is kept in an XML database of the document storage unit 106. In this way, a search can be performed by using the tags embedded in the processes above mentioned as search keys. In the present embodiment, the document-specifying character string (for example, the document name or the document ID) of the document data, related to the text information is also stored related to the XML document. This enables to identify the XML documents using the document-specifying character string, and thus the XML documents can be retrieved by using the document-specifying character string.

The XML documents and the document data thus stored in the document storage unit 106 are selectively presented in response to a search request from a user.

The display unit 115 performs a process of displaying various kinds of information on a monitor (not shown). For example, the display unit 115 performs a process of displaying a screen for performing a search for the document data or the XML documents stored in the document storage unit 106, or a screen for showing a search result. In another example, the display unit 115 performs a process of displaying a search refinement screen including search candidates generated by the candidate generating unit 120, which is explained later. A pull-down menu and the like can be displayed on the search refinement screen.

The user-input receiving unit 116 receives an input of information inputted by a user through an input device (not shown). Any information that can be inputted by a user, such as a search request and a selection of a search candidate, can be the input information received by the user-input receiving unit 116.

When a character string such as an organization name is changed due to an organization change, or the like, the user-input receiving unit 116 receives an input of the character string included in the document data or the XML document displayed by the display unit 115.

When the user-input receiving unit 116 receives the input of the character string, the determining unit 121 determines whether there is a document name associated with the received character string, based on the tag indicating details of the modification relation (for example, <subject>, <object>, and <action>) and the tag <document> embedded in the text document information.

In the present embodiment, when a sentence including the inputted character string includes a character string enclosed by the tag <document> and when the inputted character string and the character string enclosed by the tag <document> have a modification relation, the determining unit 121 determines that there is a document-specifying character string associated with the received character string.

When the determining unit 121 determines that there is a document-specifying character string, the search unit 117 searches the document storage unit 106 using the document-specifying character string, and the document obtaining unit 118 obtains detected XML documents or document data related to the XML documents.

The link identification information is used to identify the document data or the XML documents. More specifically, when the link identification information assigned to the document name is "val="external"", the search unit 117 performs a search considering that the documents is stored in the document storage unit 106, and the document obtaining unit 118 obtains the retrieved document data or XML document. When the link identification information is "val="internal"", it is considered that the information indicates a chapter, a section, or the like in the document data or the XML document currently referred to, and then the document obtaining unit 118 obtains the chapter, a section, or the like in the document data or the XML document.

In a different manner as that of the present embodiment, when a path indicating the document data or the XML document is described in the link identification information, the document obtaining unit 118 can obtain the document data or the XML document based on the link identification information.

The search unit 117 searches the XML database in the document storage unit 106 for the XML documents, in response to a search request from a user. To perform the search, the search unit 117 analyzes the search request inputted by the user, and generates a query for performing the search. The search unit 117 can search for the XML documents by outputting the generated query to the document storage unit 106. Because the XML documents and the inputted document data are related to each other, the document data can be also identified.

In other words, the search unit 117 provides a function as an identifying unit that identifies the XML document indicated by the document name, or document data corresponding to the XML document, by performing the search.

The document obtaining unit 118 obtains the document data or the XML documents requested by the user from the document storage unit 106. For example, when the search is performed using the query inputted by the search unit 117, the document obtaining unit 118 obtains the XML documents as a result of the search, and the document data related to the XML documents.

The candidate generating unit 120 generates candidates for search criteria used to refine the XML documents or the document data desired by the user. The candidate generating unit 120 obtains the plural XML documents as the result of the search according to the search criteria inputted by the user from the document obtaining unit 118. The candidate generating unit 120 then combines information (for example, document elements assigned with the tags) included in the plural XML documents, respectively, to generate candidates for search criteria used to perform an additional refinement. Thus, the candidate generating unit 120 organizes the search results by combining the results in units of document elements.

The display unit 115 displays the candidates for the search criteria generated by the candidate generating unit 120. When the user-input receiving unit 116 receives a selection from the candidates for the search criteria, the search unit 117 performs the search by using the selected candidate as a search key. The document obtaining unit 118 obtains the retrieved XML document, and the candidate generating unit 120 generates candidates again. By repeating these processes, the document data can be refined into those desired by the user.

The search procedure that is performed using an interface for performing the search as shown in FIG. 14 is explained.

To extract document elements displayed in the pull-down menu of "subject/position", the search unit 117 first searches the document storage unit 106. For example, the search unit 117 searches for document elements assigned with the tag <subject> or <position>. The candidate generating unit 120 then generates candidates to be displayed in the pull-down menu, from the detected document elements. The display unit 115 then displays the pull-down menu of "subject/position" including the generated candidates. In the example shown in FIG. 14, it is assumed that "information management representative" and the like are listed in a pull-down menu 1401. It is also assumed that the user-input receiving unit 116 then receives a selection of "information management representative" from the user.

The search unit 117 then searches for relevant document elements in the tag <action>, using the selected "subject/position" and the XML document. In an example of the search, document elements in the tag <action> embedded in sentences including the selected "subject/position" can be retrieved.

Upon completion of the retrieval of the document elements in the tag <action> by the search unit 117, the candidate generating unit 120 generates search candidates from the detected document elements, and the display unit 115 displays a pull-down menu 1402 of "action". The pull-down menu 1402 presents "apply", "manage", and "administer", "participate", for example. It is assumed here that the user-input receiving unit 116 receives a selection of "apply" from the user.

The search unit 117 then searches for document elements related to the "information management representative" and "apply" in the tag <object>. The same processes as those in the case of the tag <action> are performed then. Accordingly, the document elements in the tag <object> are extracted, and then the display unit 115 displays a pull-down menu 1403 of "object". The pull-down menu 1403 presents "external-server management application form", "new-user registration application form", "domain participation application form", and "all-night operation application form", for example It is assumed here that the user-input receiving unit 116 receives a selection of "external-server management application form" from the user.

It is assumed that the tag <document> is assigned to the selected "external-server management application form", and that "val="external"" is embedded therein as an attribute value of the tag <document> by the link-information embedding unit 114. Accordingly, it can be recognized that document data different from the target XML document is indicated.

The search unit 117 generates a query for obtaining document data having a title of "external-server management application form" from the document storage unit 106, and outputs the generated query to the document storage unit 106. Accordingly, the document data having the title of "external-server management application form" can be retrieved.

When the corresponding document data is detected, the document obtaining unit 118 obtains the document data, and the display unit 115 displays the document data. Accordingly, the user can view the document data refined by using the pull-down menu and matching the search criteria.

In this way, the user can obtain the document data stored in the document storage unit 106, without inputting a search word.

When the user refines the search candidates by means of the pull-down menu and therefore a specific partial structure of the document data, such as "Article 3, Paragraph 2 of the external-server management application form", is indicated as an object, the search unit 117 generates a query for searching for the document data, that is, Article 3, Paragraph 2 of the "external-server management application form". The search unit 117 then searches the document storage unit 106. The search can be easily achieved because the tags <section> and <subsection> are embedded by the document-structure embedding unit 112, and stored in the document storage unit 106 in a state where the corresponding XML form is held.

The document obtaining unit 118 searches for the corresponding tags <section> and <subsection>, and identifies the partial structure, like in the example of the XML document as shown in FIG. 13. Accordingly, the document obtaining unit 118 can extract only the partial structure corresponding to Article 3, Paragraph 2, and preferentially presents the extracted partial structure to the user.

An example in which relevant document data is presented is explained. In this example, in the analyzed XML documents stored in the document storage unit 106, wordings or department names in the document data are changed with a modification such as revision of the business contents of the organization.

In this example, an old name "information-security management representative" is modified to a new name "information-security management expert" with a modification of the organization and revision of the businesses. It is assumed that the old name "information-security management representative" is described in the document data currently referenced by the user. It is assumed that the user then requests to reference other document data that are affected by the modification.

Figure 15:
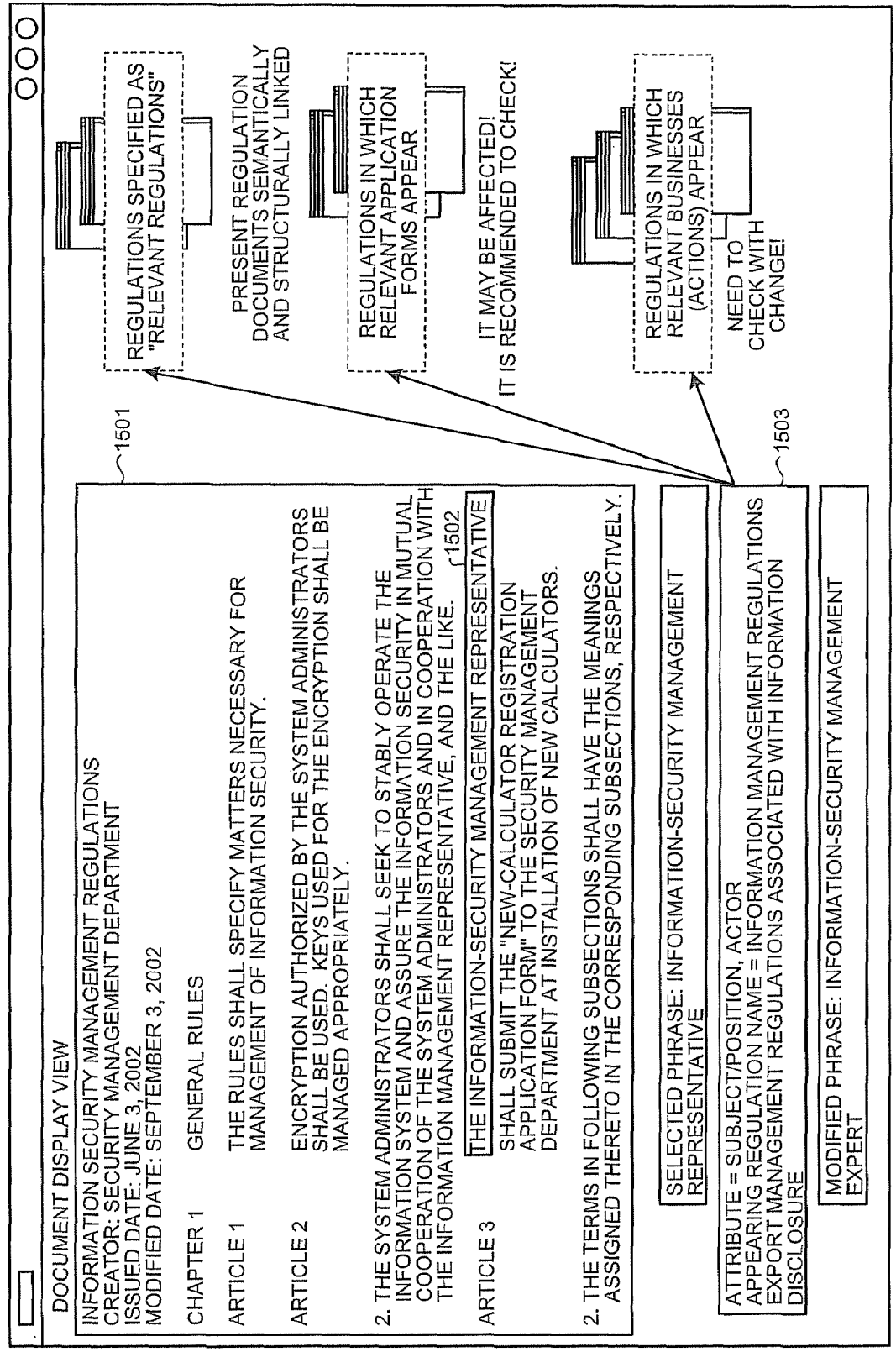
FIG. 15 is a drawing illustrating an example of an interface used when a character string included in document data is to be replaced.

In the example as shown in FIG. 15, the user selects a character string to be changed, from the document data referenced in a document display view 1501. Accordingly, the user-input receiving unit 116 receives a selection of "information-security management representative" 1502 included in the document data.

The document obtaining unit 118 obtains XML documents related to the document data. The display unit 115 then displays attributes indicated by the tags assigned to the selected character string, and document names (for example, a name of a document that describes regulations) including the selected character string, in a predetermined display area 1503.

In the example as shown in FIG. 15, the display unit 115 displays that the tags indicating the subject/position and the actor are assigned to "information-security management representative". The display unit 115 further displays names of regulation documents including "information-security management representative".

At this time, the determining unit 121 determines whether there is a document name having a relation with the selected character string "information-security management representative". In the present embodiment, the tags <subject>, <action>, and <object> are assigned to the XML documents according to the modification relations. When a character string included in the tag <subject> is changed, the determining unit 121 determines whether there is a document name or document ID that is a character string in the tag <object> indicating a modification relation with the tag <subject> that includes the target character string in the same sentence and is assigned with the tag <document>. When the character string to be changed is included in the tag <object>, the determining unit 121 determines whether the character string included in the tag <subject> includes a document name.

When the determining unit 121 determines that there is a document name, the search unit 117 searches the document storage unit 106 for the document name, so that the document obtaining unit 118 obtains the corresponding XML document, or document data related to the XML document. The obtained XML document or document data is document data including businesses associated with the "information-security management representative". The display unit 115 then displays the obtained XML document or document data as regulations include relevant businesses (actions).

In this way, when a character string is to be changed, an XML document or document data that is particularly highly relevant can be identified. More specifically, regulations including relevant businesses (actions) performed by the "information-security management representative" as the actor can be presented to the user.

In the present embodiment, document data to be obtained is not limited to the document data having a modification relation. All document data linked by the tags <document> that are embedded in the document data displayed in the document display view 1501 can be obtained.

The search unit 117 further searches for XML documents linked with the displayed document data. This search is performed for the document storage unit 106 by using, as a search key, the tag <document> including the document name of the document data or XML document displayed in the document display view 1501.

The search unit 117 searches the document storage unit 106 for the XML documents including "information-security management representative". The document obtaining unit 118 obtains the retrieved XML documents, and document data related to the XML documents.

That is, the document obtaining unit 118 obtains an XML document having a relation with the character string to be changed, an XML document linked with the displayed XML document, an XML document including the character string to be changed, and document data related to these XML documents.

In this way, all the XML documents and document data that are considered relevant can be obtained. Therefore, the user can easily check a range of documents that need to be changed.

At this time, influences caused by the change of the character string "information-security management representative" are presented on a different axis, for example, to navigate and call attention to the user.

The display unit 115 displays, among the obtained document data, relevant regulations and regulation documents described in the document data already displayed, by means of an icon or file name, for example. The display unit 115 further displays a file name or a corresponding part together with a message, such as "It may be affected", to urge the user to check whether relevant "application forms" include a part to be revised with the change of the organization or the businesses. Accordingly, confirmation can be recommended to the user.

Confirmation of details of descriptions on the target businesses can be recommended with the change, together with a message such as "Need to check".

When the user inputs a replacement character string "information-security management expert", the user-input receiving unit 116 replaces the corresponding character string with the replacement character string in all the document data obtained as the relevant regulations. The display unit 115 only displays document data as a replacement target, or a part (partial structure) to be changed in the corresponding document data, among the document data obtained as the relevant regulations, thereby enabling to easily identify the part to be changed.

The display unit 115 can display the document data obtained by the document obtaining unit 118, according to the types of the documents. In the example as shown in FIG. 15, the display unit 115 displays the relevant regulations that can only be viewed, and the application forms that can be filled in, separately. This separation is performed according to the file types. The display unit 115 can display particularly the relevant documents being highlighted among the linked document data, based on parts to be changed in the document data.

The procedure performed by the document processing apparatus 100 to store document data is explained with reference to FIG. 16.

The input unit 107 first performs a process of inputting the document data (Step S1601). The text-document extracting unit 108 extracts text information from the document data, as text document information (Step S1602).

The morphological analyzing unit 109 performs a morphological analysis of the extracted text information, to assign a word class and a word class number to each morpheme (Step S1603).

The syntactic analyzing unit 110 performs a syntactic analysis of the text information based on the Japanese grammar, using a result of the morphological analysis at Step S1603 (Step S1604).

The logical-structure unit 111 assigns a tag indicating an attribute to a character string included in the text information using the structuring rules stored in the structuring-rule storage unit 102, to embed the attribute tag in the text information (Step S1605).

The file-type determining unit 113 determines file types with respect to the text information and the document data from which the text information is extracted (Step S1606). The determined file types are embedded in the text information. A result of an analysis of a file name, performed at the file type determination, is embedded in the text information as the meta information.

When the character string in the text information includes a document name, the link-information embedding unit 114 embeds link identification information in the document name (Step S1607).

The registering unit 119 registers the text information having the tags embedded therein in the processes above mentioned, in the document storage unit 106 as an XML document (Step S1608). At this time, the XML document is related to the inputted document data.

According to the processes above mentioned, the XML document having the analysis results embedded therein can be stored in a retrievable state.

Figure 17:
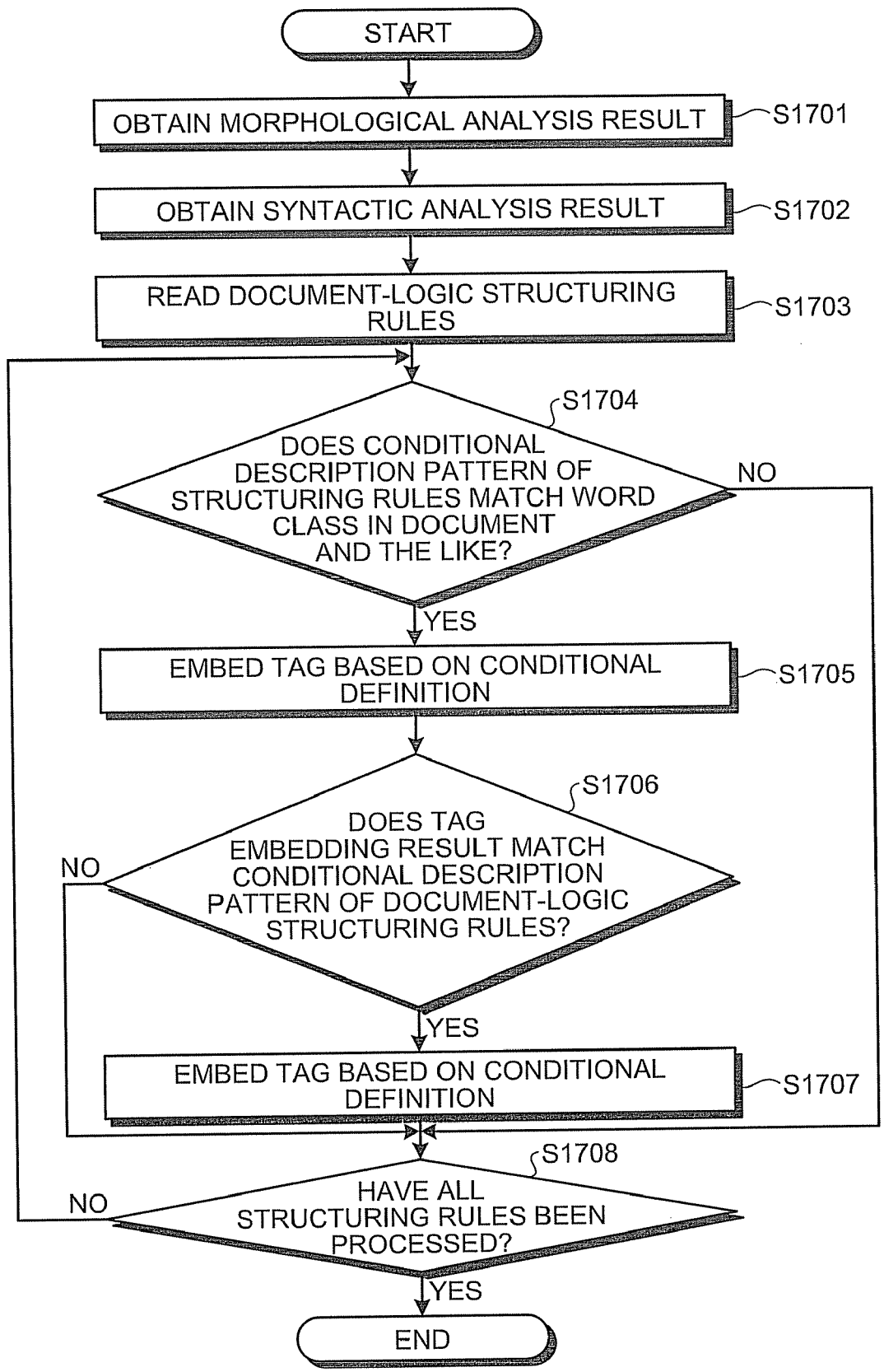
FIG. 17 is a flowchart of a process procedure of embedding the attribute tags, performed by the logical-structure embedding unit.

The procedure of assigning the attribute tag, performed at Step 51605, is explained with reference to FIG. 17. The logical-structure unit 111 first obtains the result of the morphological analysis performed by the morphological analyzing unit 109 (Step S1701).

The logical-structure unit 111 then obtains the result of the syntactic analysis performed by the syntactic analyzing unit 110 (Step S1702).

The logical-structure unit 111 reads the document-logic structuring rules from the document-logic structuring-rule storage unit 103 (Step S1703).

The logical-structure unit 111 determines whether a conditional description pattern of the read document-logical structuring rules matches a character string in the text information, a word class (number) of the character string, and the syntactic analysis result (Step S1704). When determining that they do not match with each other (NO at Step S1704), the logical-structure unit 111 performs no process.

When determining that they match with each other (YES at Step S1704), the logical-structure unit 111 embeds an attribute tag based on a conditional definition related to the conditional description pattern, in a corresponding location in the text information (Step S705).

At Step 51704, the document specifying unit 141 identifies a document-specifying character string in the text document information according to the conditional description pattern of the read document-logical structuring rules. At Step 51705, the document-tag unit 142 embeds the tags <document> in locations corresponding to the identified document-specifying character string in the text information, according to the conditional definition related to the conditional description pattern.

When the read document-logical structuring rules include one using the assigned tags, the logical-structure unit 111 determines whether a result of the tag embedding matches the conditional description pattern of the document-logic structuring rules (Step S1706). When determining that they do not match with each other (NO at Step S1706), the logical-structure unit 111 performs no process.

When determining that they match with each other (YES at Step S1706), the logical-structure unit 111 embeds an attribute tag based on the conditional definition related to the conditional description pattern, in the corresponding location in the text information (Step S1707). The document-tag unit 142 performs the same process.

The logical-structure unit 111 then determines whether the processes for all the document-logical structuring rules have been completed (Step S1708). When determining that not all the document-logic structuring rules have been processed (NO at Step S1708), the logical-structure unit 111 performs the processes from Step 51704 again.

When determining that all the structuring rules have been processed (YES at Step S1708), the logical-structure unit 111 terminates the processes.

In the process procedure above mentioned, various tags are embedded in the text information. For example, the tag <document> is assigned to the document name, or the tags <subject>, <object>, and <action> are assigned according to the modification relations.

Figure 16:
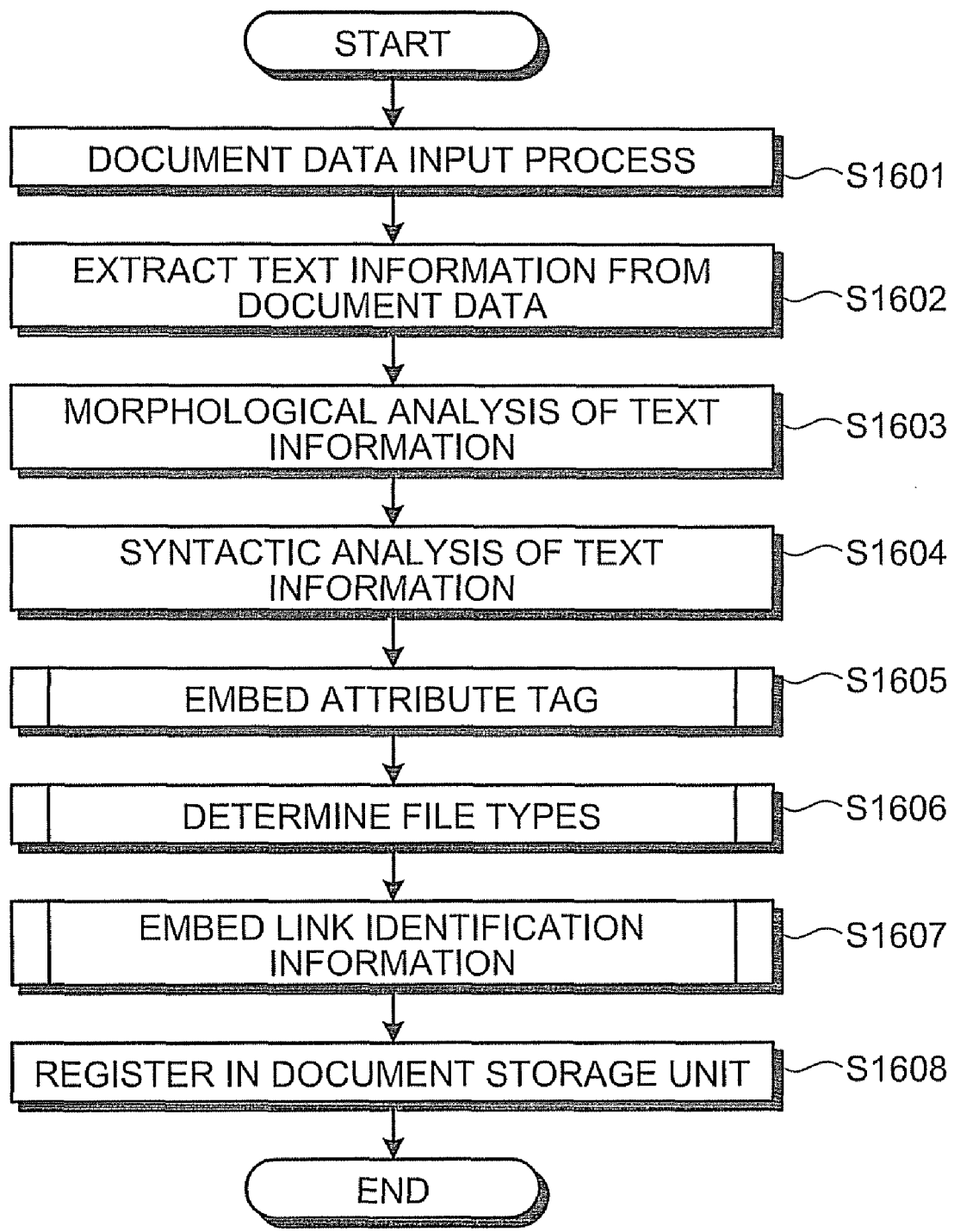
FIG. 16 is a flowchart of a process procedure performed by the document processing apparatus to store document data.
Figure 18:
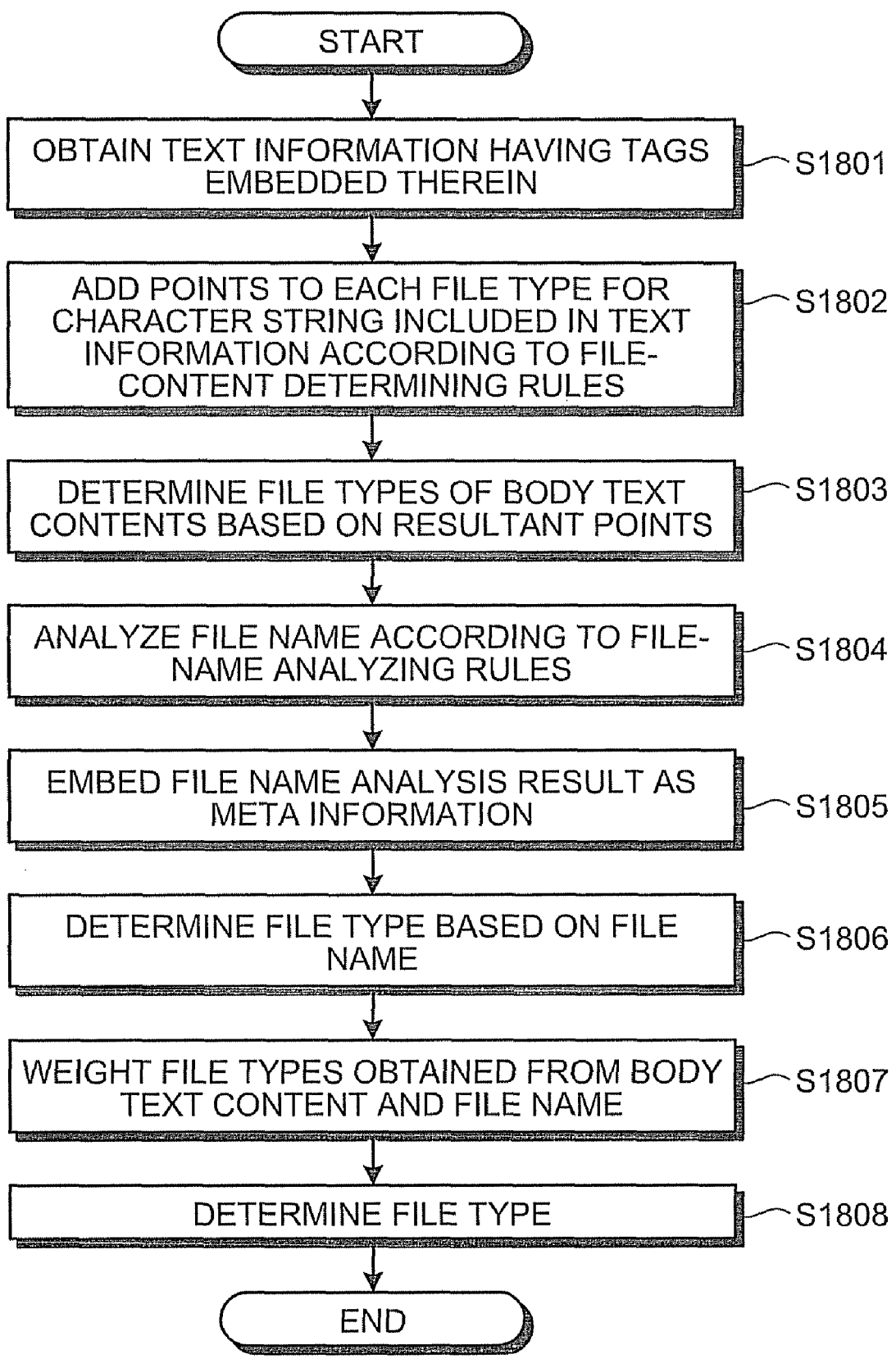
FIG. 18 is a flowchart of a process procedure of determining a file type, performed by a file-type determining unit according to the embodiment.

The procedure of determining the file type, performed at Step 51606 in FIG. 16, is explained with reference to FIG. 18.

The body-text-content determining unit 131 of the file-type determining unit 113 first obtains the text information having the tags embedded therein at Step 51605 in FIG. 16 (Step S1801).

The body-text-content determining unit 131 then determines whether a predetermined character string is included in a predetermined document structure of the text information, using the file-content determining rules in the file-content determining-rule storage unit 104. When the corresponding character string is included, the body-text-content determining unit 131 adds points to be assigned to the file type related by the file-content determining rules (Step S1802).

Upon completion of the process at Step S1802 for the entire text information, the body-text-content determining unit 131 refers to total points of each file type, and selects a predetermined number of file types successively from one having highest points, as a determination result for the body text contents of the document data (Step S1803).

The file-name determining unit 132 then analyzes a file name of the document data from which the text information is extracted, using the file-name analyzing rules (Step S1804).

The file-name determining unit 132 then embeds a result of the file name analysis in the text information as meta information (Step S1805).

The file-name determining unit 132 then determines a file type based on the result of the file name analysis (Step S1806).

The file-type determining unit 113 then weights the result of the file type determination by the body-text-content determining unit 131 and the result of the file type determination by the file-name determining unit 132, respectively (Step S1807).

The file-type determining unit 113 finally determines a file type based on results of the weighting to the file type (Step S1808).

Figure 19:
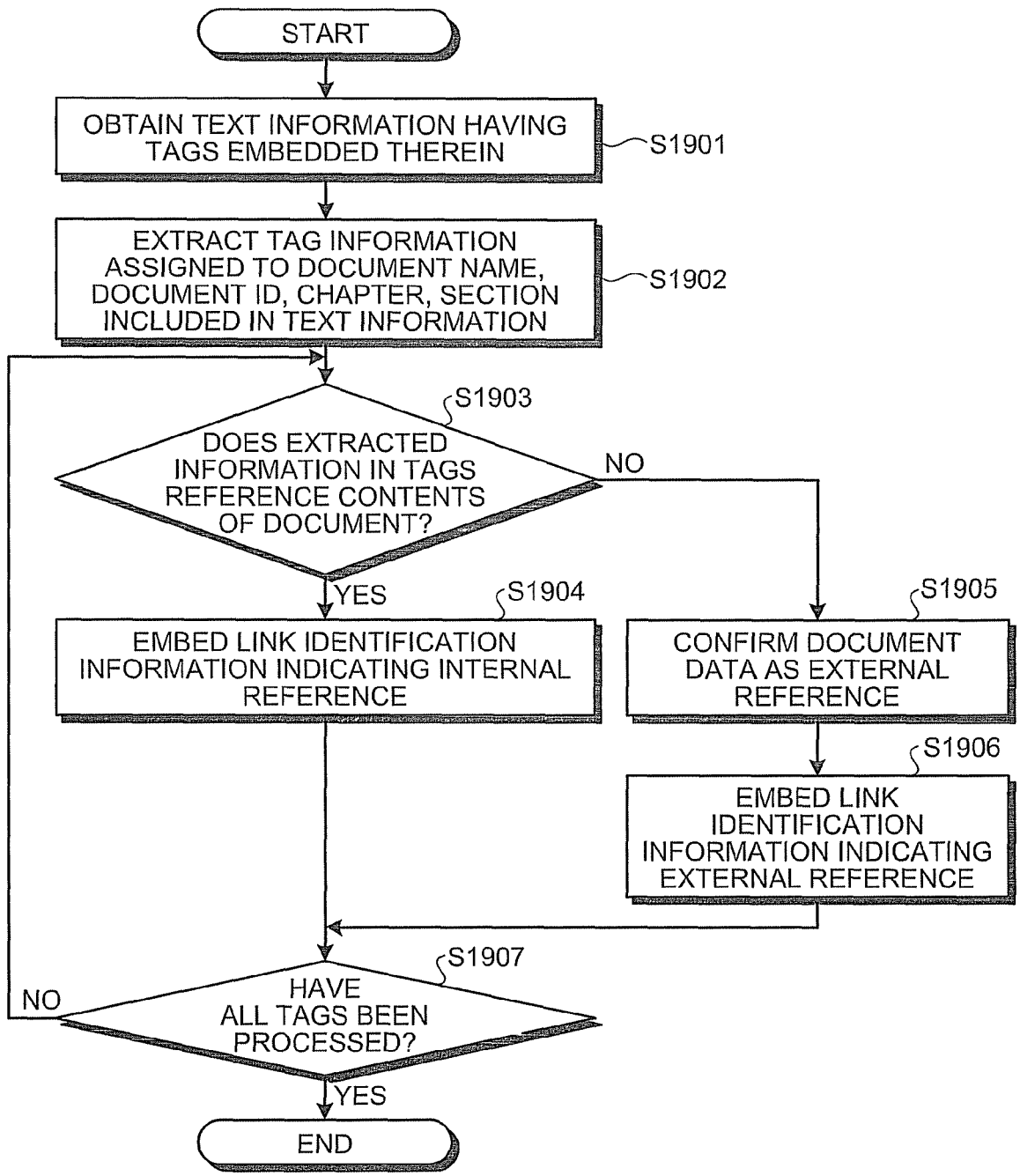
FIG. 19 is a flowchart of a process procedure of embedding link identification information, performed by the link-information embedding unit.

The procedure of embedding the link identification information, performed at Step S1607 in FIG. 16, is explained with reference to FIG. 19.

The link-information embedding unit 114 first obtains the text information having the tags embedded therein (Step S1901).

The link-information embedding unit 114 then extracts, from the obtained text information, tag information assigned to the document name, the document ID, a chapter, a section, and the like (Step S1902). That is, the link-information embedding unit 114 obtains information in the tags <document>.

The link-information embedding unit 114 then determines whether the extracted information in the tags references the contents of the document (Step S1903). When determining that the contents of the document are referenced (YES at Step S1903), the link-information embedding unit 114 embeds link identification information indicating internal reference ("val="internal"") in the tag <document> (Step S1904).

On the other hand, when determining that the contents of the document are not referenced (NO at Step S1903), the link-information embedding unit 114 determines that data outside the document are referenced, and checks the document storage unit 106 to confirm that there is document data as an external reference (Step S1905).

The link-information embedding unit 114 then embeds link identification information indicating the external reference ("val="external"") in the tag <document> (Step S1906).

The link-information embedding unit 114 then determines whether the processes for all the extracted tag information have been completed (Step S1907). When determining that not all the tag information has been processed (NO at Step S1907), the link-information embedding unit 114 performs the processes from Step 51903 again.

When determining that all the extracted tag information has been processed (YES at Step S1907), the link-information embedding unit 114 terminates the processes.

Figure 20:
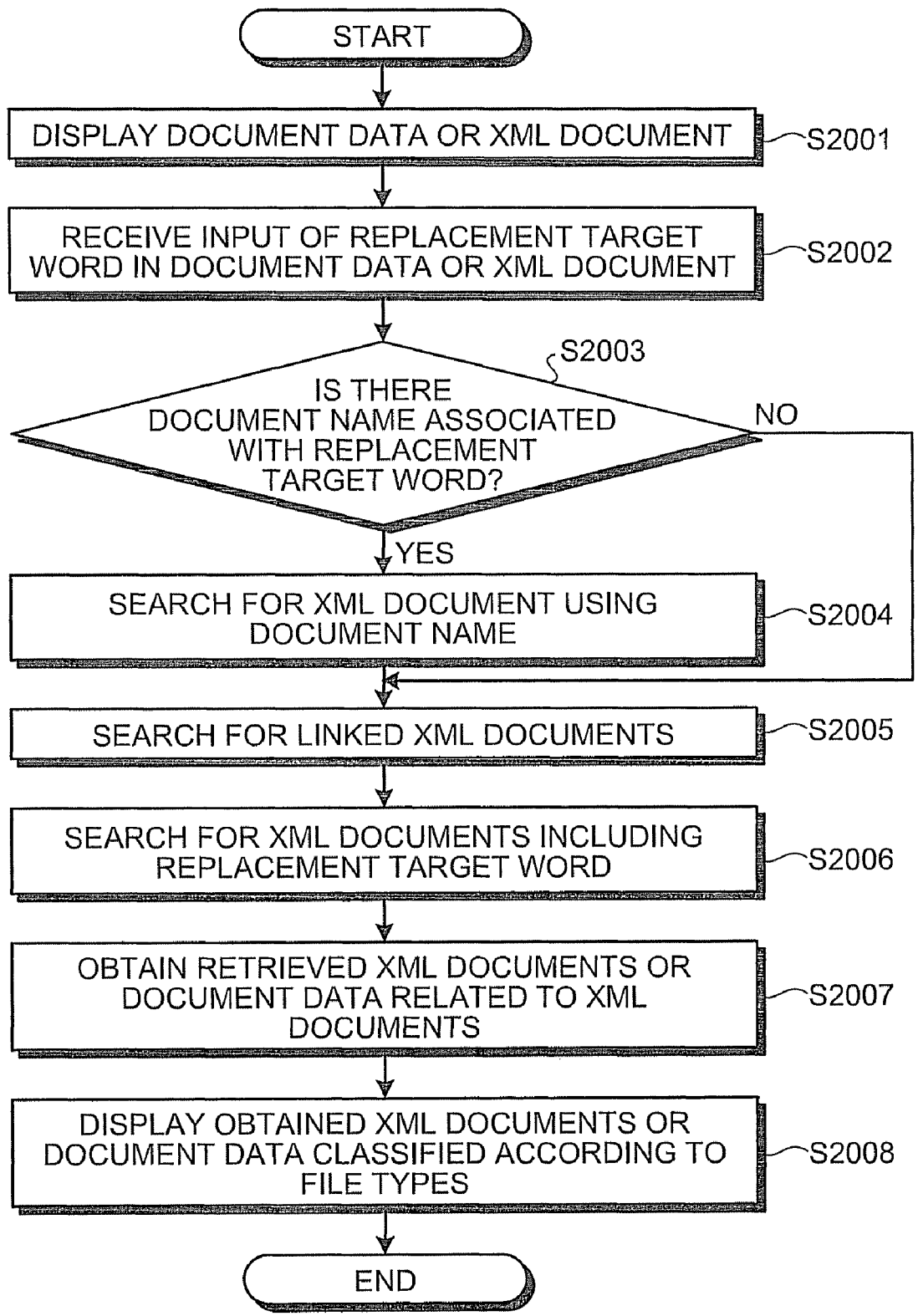
FIG. 20 is a flowchart of a process procedure of presenting XML documents affected when a replacement target word is replaced, performed by the document processing apparatus.

The process procedure performed by the document processing apparatus 100 to present XML documents affected when a replacement target word is replaced is explained with reference to FIG. 20.

The display unit 115 first displays an XML document, which is a kind of the text document. information (Step S2001). The object to be displayed can be document data.

The user-input receiving unit 116 then receives an input of a replacement target word (character string) in the XML document (Step S2002). In the example shown in FIG. 15, "information-security management representative" is the replacement target word. When the object to be displayed is the document data, an input of the replacement target word in the document data is received.

In the case of the document data, following processes are performed for the XML document related to the document data.

The determining unit 121 then determines whether there is a document name associated with the received replacement target word (Step S2003). When the determining unit 121 determines that there is no document name (NO at Step S2003), no process is performed. The criteria as described above are used to determine the relevant document, and thus redundant explanations are not given.

When the determining unit 121 determines that there is a document name associated with the replacement target word (YES at Step S2003), the search unit 117 searches the document storage unit 106 for an XML document by using the document name (Step S2004).

The search unit 117 then searches the document storage unit 106 for XML documents linked with the document name related to the referenced XML document (Step S2005).

The search unit 117 further searches the document storage unit 106 for XML documents including the replacement target word (Step S2006).

The document obtaining unit 118 then obtains the retrieved XML documents, or document data related to the retrieved XML documents (Step S2007).

The display unit 115 then displays the obtained XML documents or document data, classified according to the file types determined with respect to the XML documents (Step S2008).

When a character string is to be changed, the document processing apparatus 100 can present document data or XML documents associated with the character string, to the user. Therefore, operation burdens on the user can be reduced.

The document processing apparatus 100 can further present XML documents to which a link is provided on the referenced XML document, XML documents that provide a link to the referenced XML document, XML documents including the character string as the replacement target, and document data related to these XML documents, to the user. Therefore, the user can see a range or locations affected in the document, and thus costs required for revision and checking can be reduced.

In the document processing apparatus 100, the user can reference desired document data or XML documents by selecting an appropriate character string by means of the pull-down menu. Therefore, the operation burdens can be reduced by saving steps of considering and inputting a search word at the time of search. Even when the user does not conceive of an appropriate search word, an appropriate character string group can be presented, and therefore relevant document can be easily identified.

In the document processing apparatus 100, the document processing apparatus 100 itself performs the structural analysis or the like of the document data, and registers therein the result of the structural analysis, to obtain the effect above mentioned. Accordingly, burdens on the user of inputting a relation between document data can be reduced.

The present invention is not limited to the present embodiment, and various modified examples as described below are possible.

In the document processing apparatus 100 according to the above embodiment, when a refinement search for document data is performed, refinement of document data is performed on the search screen as shown in FIG. 14, based on the modification relation included in specific document data. However, the present embodiment does not intend to limit to the refinement of XML documents into those indicated by the tag <object> in the XML documents.

In a modified example of the embodiment, document data indicated by the modification relation, or document data including the modification relation is selected.

Figure 21:
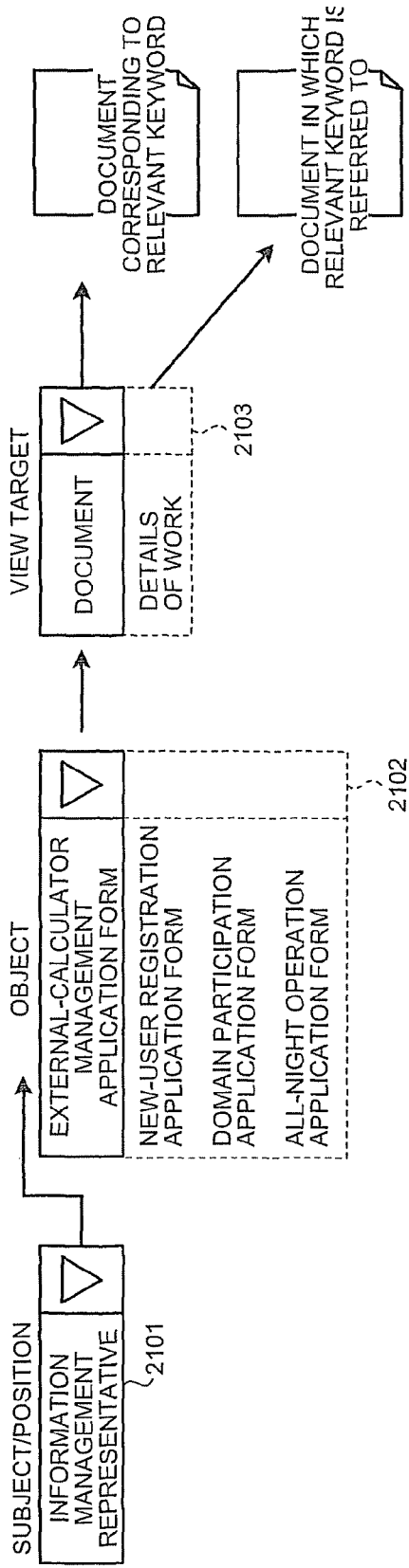
FIG. 21 is a drawing illustrating an example of a search interface for identifying document data using a pull-down menu in a document processing apparatus according to a modified example of the embodiment.

A search procedure performed using an interface for performing a search as shown in FIG. 21 is explained.

To extract document elements to be displayed in the pull-down menu of "subject/position", the search unit 117 first searches the document storage unit 106. For example, the search unit 117 searches for document elements assigned with the tag <subject> or <position>. The candidate generating unit 120 then generates candidates to be displayed in the pull-down menu based on the retrieved document elements. The display unit 115 then displays a pull-down menu 2101 of "subject/position" including the generated candidates. In the example shown in FIG. 21, the pull-down menu 2101 lists "information management representative", and the like. It is assumed here that the user-input receiving unit 116 receives a selection of "information management representative" from the user.

The search unit 117 then searches for document elements in the tag <object> related to "information management representative". Upon completion of the search for the document elements in the tag <object> by the search unit 117, the candidate generating unit 120 generates search candidates from the retrieved document elements, and the display unit 115 displays a pull-down menu 2102 of the "object". The pull-down menu 2102 presents "external-calculator management application form", "new-user registration application form", "domain participation application form", "all-night operation application form", and the like. It is assumed here that the user-input receiving unit 116 receives a selection of "external-calculator management application form" from the user.

The display unit 115 then displays a pull-down menu 2103 of "view target". The pull-down menu 2103 presents "document" and "details of work", for example.

Selection of "document" from the pull-down menu 2103 indicates that a "document" corresponding to the selection from the pull-down menu 2102 is selected. Selection of "details of work" from the pull-down menu 2103 indicates that documents including the name of the "document"

selected from the pull-down menu 2102, and the name of "subject/position" selected from the pull-down menu 2101 are selected.

That is, when "document" is selected from the pull-down menu 2103, a search is performed by using the name of the document as a search key, like in the present embodiment. When "details of work" is selected, the search unit 111 performs a search for XML documents including the selected "subject/position" and "document."

According to this modified example, document data or XML documents that the user wants to view can be easily presented.

Figure 22:
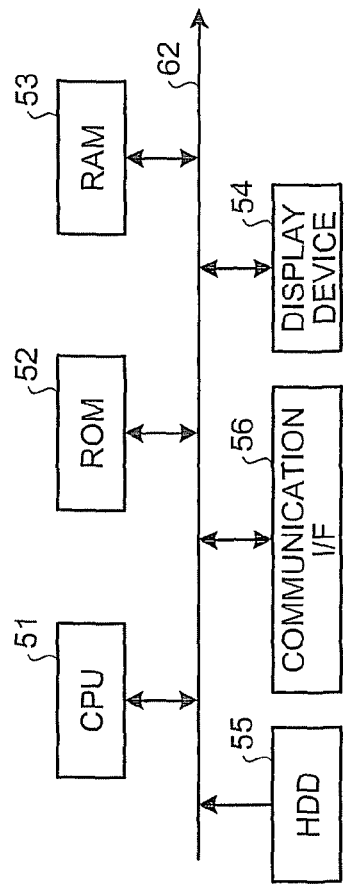
FIG. 22 is a drawing illustrating a hardware configuration of the document processing apparatus according to the embodiment

As shown in FIG. 22, the document processing apparatus 100 has a hardware configuration including a read only memory (ROM) 52 that stores therein a document processing program for realizing the processes above mentioned, and the like, a central processing unit (CPU) 51 that controls components of the document processing apparatus 100 according to the program in the ROM 52, a random access memory (RAM) 53 as a data storage area, a communication interface (I/F) 56 that connects to a network to establish communications, a display device 54, a hard disk drive (HDD) 55 that stores therein information, and a bus 62 that connects these components.

The document processing program can be provided being recorded in a computer-readable recording medium such as a compact disk read only memory (CD-ROM), a flexible disk (FD), a digital versatile disk (DVD), and the like, in a file of an installable or executable form.

In this case, the document processing program is read from the recording medium and executed by the document processing apparatus 100, thereby being loaded in the RAM 53, so that the components above mentioned are generated in the RAM 53 as software components.

The document processing program according to the present embodiment can be stored in a computer connected to a network such as the Internet, and downloaded through the network.

While the present invention has been explained with reference to an exemplary embodiment, the configurations in the embodiment can be appropriately combined and various changes and improvements can be made to the embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document processing apparatus comprising:
an extracting unit that extracts text document data from first document data contained in a first file;
an analyzing unit that identifies a modification relation between a first character string and a second character string included in the text document data;
an attribute embedding unit that embeds an attribute in the text document data, the attribute representing the modification relation;
a document specifying unit that identifies the second character string as being a document-specifying character string that specifies second document data contained in a second file differing from the first file;
a document-identification unit that embeds a document tag in the text document data, the document tag tagging the second character string as the document-specifying character string;
a receiving unit that receives an input character string;
a determining unit that determines that the input character string matches the first character string, and, in response to determination that the input character string matches the first character string, identifies the document-specifying character string having the modification relation with the first character string based on the attribute and the document tag embedded in the text document data;
an identifying unit that identifies the second document data contained in the second file specified by the document-specifying character string in response to the determination that the input character string matches the first character string; and
a central processing unit configured to execute at least the determining unit.

2. The apparatus according to claim 1, further comprising a document obtaining unit that obtains the second document data identified by the identifying unit.

3. The apparatus according to claim 2, wherein the document obtaining unit further obtains third document data identified by a second document-specifying character string in the text document data, the second document-specifying character string having no modification relation with the first character string.

4. The apparatus according to claim 2, further comprising:
a type determining unit that determines a type of the text document data, and embeds the type in the text document data; and
a display unit that displays the second document data obtained by the document obtaining unit while classifying in units of types embedded in the text document data.

5. The apparatus according to claim 1, further comprising:
a candidate display unit that displays a candidate character string associated with the attribute;
a selection receiving unit that receives a selection of the candidate character string displayed by the candidate display unit; and
a search unit that searches for one or more documents including the candidate character string and retrieves the one or more documents.

6. The apparatus according to claim 5, further comprising:
a candidate extracting unit that extracts a set of candidate character strings having a modification relation with the candidate character string from each of the one or more documents retrieved by the searching unit, wherein
the candidate display unit further displays the set of candidate character string for selection.

7. The apparatus according to claim 1, further comprising:
a link-name-information embedding unit that embeds, within the text document data, link identification information indicating whether the second document data is indicated in the text document data, wherein
the identifying unit identifies the second text document data represented by the document-specifying character string based on the link identification information in response to a determination that the text document data includes the document-specifying character string.

8. The apparatus according to claim 1, wherein the document specifying unit identifies the second character string as being the document-specifying character string based on at least one of a document name, the document tag, or a clause or phrase in the second document data.

9. The apparatus according to claim 1, wherein the analyzing unit identifies the first character string and the second character string from among an actor, an object, or an action performed by the actor for the modification relation.

10. A document processing method comprising:
- extracting text document data from first document data of a first file;
- analyzing a modification relation between a first character string and a second character string included in the text document data;
- embedding an attribute in the text document data, the attribute indicating the modification relation;
- identifying the second character string as being a document-specifying character string that specifies second document data of a second file differing from the first file;
- embedding a document tag in the text document data, the document tag identifying the document-specifying character string;
- receiving an input character string;
- determining that the input character string matches the first character string in the text document data;
- in response to the determining, identifying the document-specifying character string having the modification relation with the first character string based on the attribute and the document tag; and
- identifying, in response to the identifying the document-specifying character string, the second document data represented by the document-specifying character string.

11. The method according to claim 10, further comprising obtaining the second document data in response to the identifying the second document data.

12. The method according to claim 11, wherein the obtaining further includes obtaining third document data corresponding to a second document-specifying character string in the text document data, the second document-specifying character string having no modification relation with the first character string.

13. The method according to claim 11, further comprising:
- determining a type of the text document data, and embedding the type in the text document data; and
- displaying the second document data classified according to type based on the type embedded in the text document data.

14. The method according to claim 10, further comprising:
- displaying, as a candidate, a candidate character string associated with the attribute;
- receiving a selection of the candidate character string; and
- searching for the candidate character string in the text document data.

15. The method according to claim 14, further comprising:
- extracting, as a set of selection candidates, a set of extracted character strings having a modification relation with the candidate character string, from each of plural pieces of the text document data retrieved by the searching; and
- displaying the set of extracted character string as the set of selection candidates.

16. The method according to claim 10, further comprising:
- embedding link identification information in the text document data, wherein
- the identifying the second document data includes identifying the second document data based on the link identification information, in response to determining that the embedded text document data includes the document-specifying character string.

17. The method according to claim 10, further comprising identifying the document-specifying character string based on at least one of a document name, the document tag, or a clause or phrase in the second document data.

18. A computer program product having a non-transitory computer-readable medium including programmed instructions for processing text information, wherein the instructions, in response to execution, cause a computing system to perform operations, including:
- extracting text document data from first document data of a first file;
- identifying a modification relation between a first character string and a second character string included in the text document data;
- embedding an attribute in the text document data, the attribute representing the modification relation;
- identifying the second character string as a document-specifying character string that specifies second document data of a second file differing from the first file;
- embedding a document tag in the text document data, the document tag identifying the document-specifying character string;
- receiving an input character string;
- determining that the input character string matches the first character string in the text document;
- in response to the determining, identifying the document-specifying character string having the modification relation with the first character string based on the attribute and the document tag embedded in the text document data; and
- in response to the identifying the document-specifying character string, identifying the second document data represented by the document-specifying character string.

19. The computer program product according to claim 18, the operations further including obtaining the second document data in response to the identifying the second document data.

20. The computer program product according to claim 19, wherein the obtaining further includes obtaining third document data identified by a second document-specifying character string in the text document data, the second document-specifying character string having no modification relation with the first character string.

* * * * *